United States Patent [19]
Gieg

[11] Patent Number: 4,653,771
[45] Date of Patent: Mar. 31, 1987

[54] METHOD FOR POSITIONING REAR TRAILER IN TANDEM TRACTOR-TRAILER ASSEMBLY

[76] Inventor: Gerald T. Gieg, 508 Terry La., Lebanon, Tenn. 37087

[21] Appl. No.: 792,053

[22] Filed: Oct. 28, 1985

[51] Int. Cl.$^4$ ............................................. B62D 53/00
[52] U.S. Cl. ................................. 280/477; 280/423 A
[58] Field of Search ................... 280/477, 423 A, 433, 280/479 R; 104/44, 48, 50; 198/448; 238/4; 414/584

[56] References Cited

U.S. PATENT DOCUMENTS

| | | | |
|---|---|---|---|
| 1,311,182 | 7/1919 | Rowntree | 104/48 X |
| 2,924,389 | 2/1960 | Anderson | 238/4 |
| 3,199,783 | 8/1965 | Hurst | 238/4 |
| 3,448,693 | 6/1969 | Graham | 104/48 |
| 3,556,011 | 1/1971 | Saxonmeyer | 104/48 |
| 3,663,039 | 5/1972 | Morgan | 280/423 A X |
| 3,746,251 | 7/1973 | Bernardi et al. | 414/584 X |
| 3,756,159 | 9/1973 | Sternad | 104/48 |
| 3,786,988 | 1/1974 | Thompson | 238/4 |
| 3,801,137 | 4/1974 | Zucca | 280/477 X |
| 4,162,082 | 7/1979 | Curry | 280/423 A X |
| 4,397,474 | 8/1983 | Mett et al. | 280/423 A |

Primary Examiner—John J. Love
Assistant Examiner—Charles R. Watts
Attorney, Agent, or Firm—Harrington A. Lackey

[57] ABSTRACT

A method and apparatus for positioning a rear trailer relative to a front trailer in a tractor-trailer tandem assembly in order to facilitate the connection of the rear trailer to the front trailer. The method includes laterally shifting a rear trailer to a connecting position behind a pre-positioned front trailer and tractor combination by placing the rear trailer upon a moveable platform, capable of being moved laterally from an initial position offset from the linear path of the tandem assembly, to a connecting position immediately behind the front trailer of the tandem assembly. The tandem assembly is then moved slightly rearwardly in order to automatically connect the connector member on the rear of the front trailer with the front end of the rear trailer.

7 Claims, 5 Drawing Figures

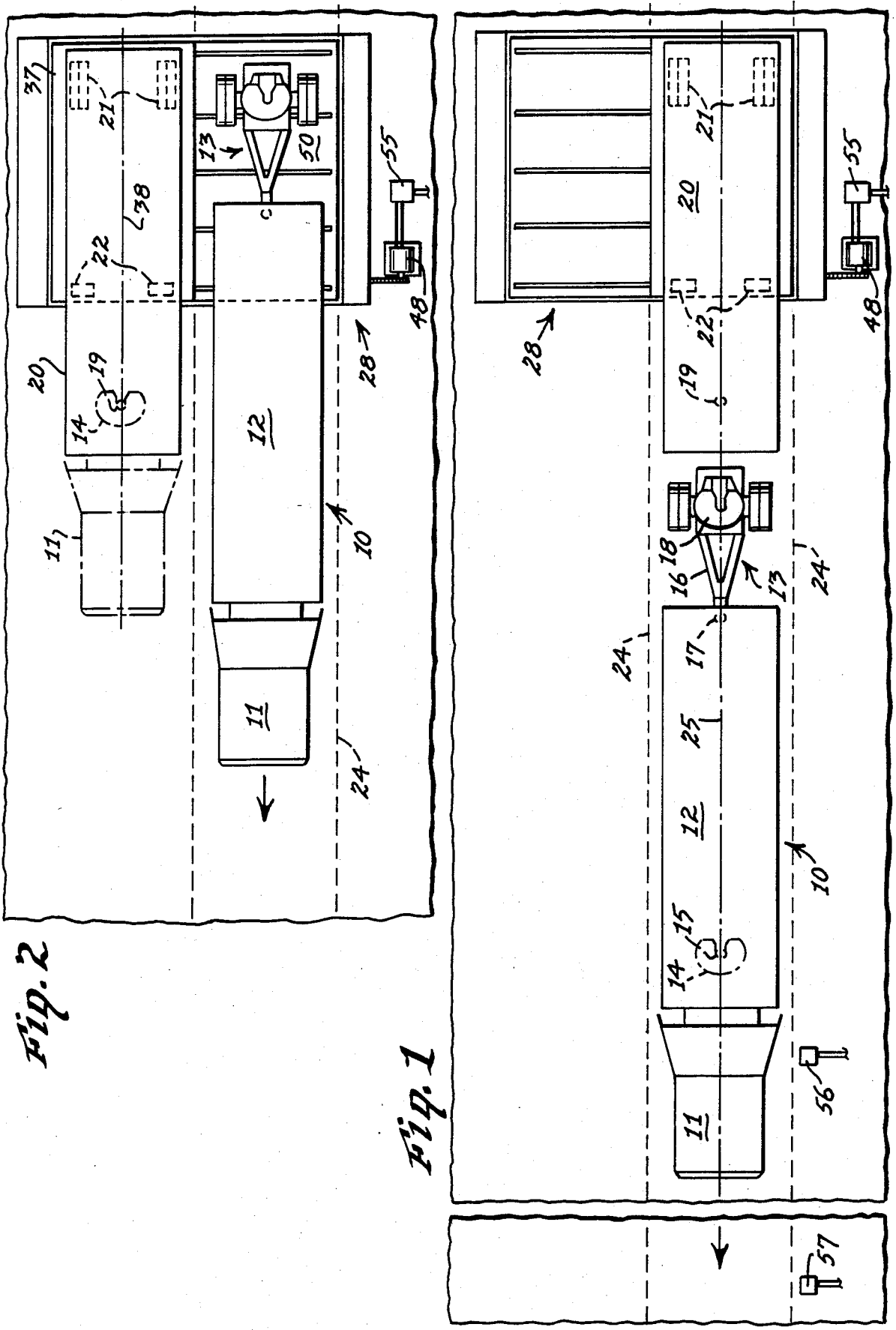

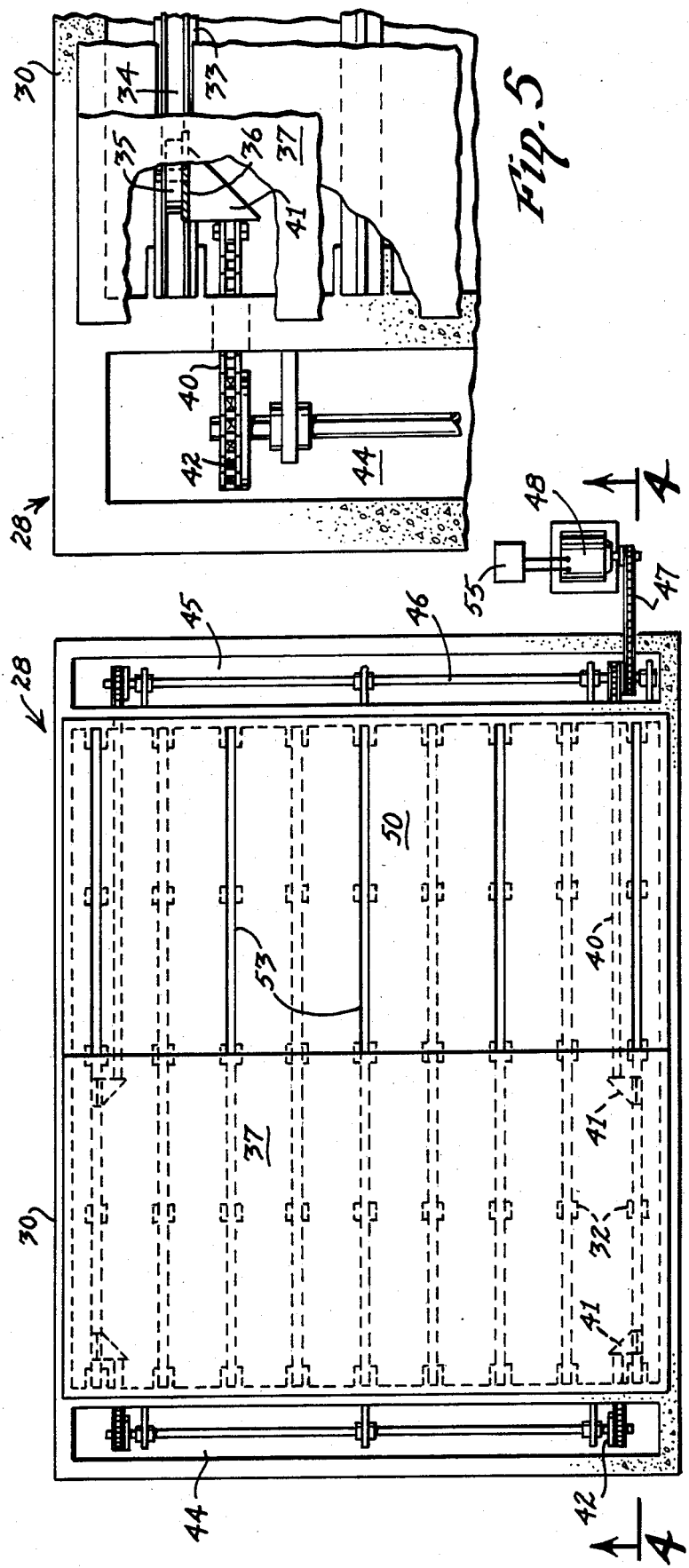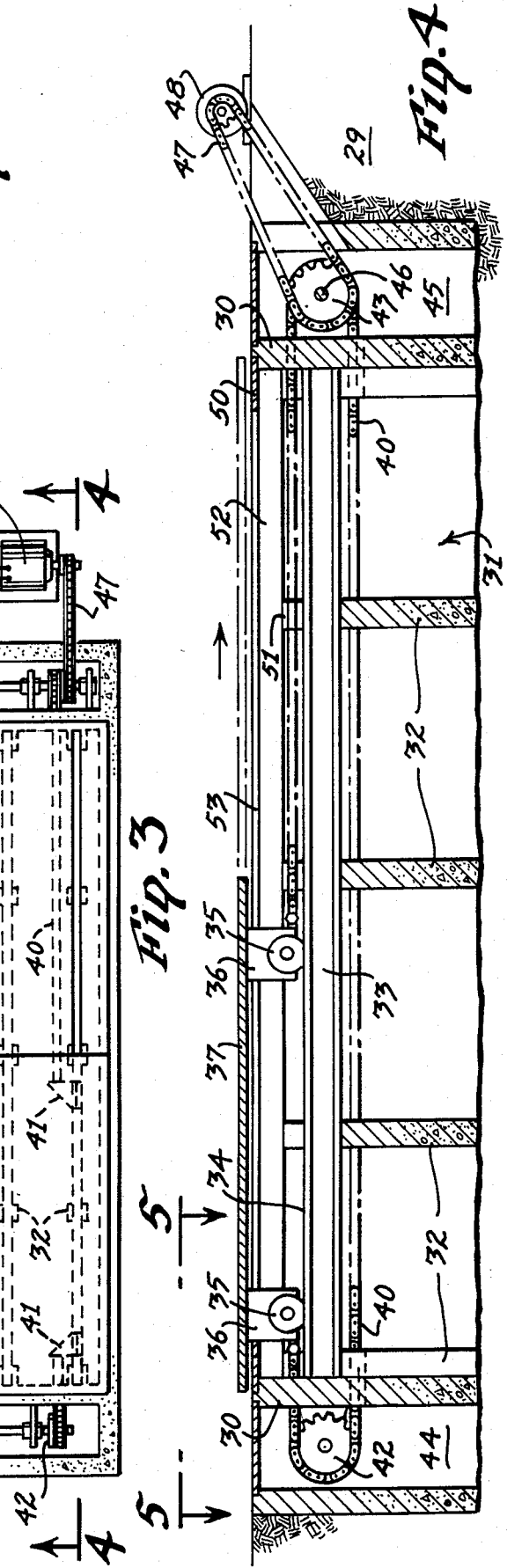

METHOD FOR POSITIONING REAR TRAILER IN TANDEM TRACTOR-TRAILER ASSEMBLY

BACKGROUND OF THE INVENTION

This invention relates to a method and apparatus for connecting a trailer in a tractor-trailer assembly, and more particularly to a method and apparatus for positioning a rear trailer behind a front trailer in a tractor-trailer combination for connection therewith.

In the trucking industry, more and more states are permitting the hauling of freight over the road in more than one trailer, connected in tandem with a tractor. The connection of a single trailer to a tractor is relatively simple since the tractor carrying a sloping fifth wheel connector on the rear of its chassis is backed up beneath the front end of the stationary trailer until the connector pin or ball at the front end of the trailer is properly seated within the socket of the fifth wheel connector. However, the connection of a second trailer to the rear of the first trailer is more involved and takes substantially more time than the connection of one trailer to a tractor, in the order of 45-50 minutes.

In order to assemble two trailers in tandem to a tractor, the tractor is first connected to the front end of a front trailer in a conventional manner, that is by backing the tractor beneath the front end of the trailer. However, since conventional trailers are not equipped with fifth wheel connectors, a separate mobile carrier supporting a connector member, and specifically a fifth wheel connector, must be located and connected by its tongue to the cooperating connector on the rear end of the front trailer. This tandem assembly, including the tractor, the trailer and the mobile connector carrier, known in the trade as a "JIFFLOX", is driven to a position as close as possible to the front end of a second or rear trailer. Since the assembly cannot be backed up or moved rearwardly more than approximately twelve feet without the connector carrier jack-knifing, the operator of the tractor must first manually unhook the carrier from the rear end of the front trailer and push it by hand to a position as close as possible to the front end of the rear trailer. Then the operator returns to his tractor and backs the front trailer slowly and carefully toward the carrier, attempting to stop approximately one foot before the rear end of the front trailer engages the tongue of the carrier. This part of the operation is extremely tedious since the driver or operator must use extreme caution in lining up the front trailer and the carrier with the rear trailer so that after the carrier is re-connected to the front trailer, the carrier does not jack-knife as the front trailer is moved rearwardly toward the front end of the rear trailer. Moreover, care must be taken not to strike the tongue of the carrier with the rear end of the front trailer, which is invisible to the operator as the tractor and front trailer move rearwardly.

After the front trailer is moved as close as possible to the carrier, the operator again gets out of the tractor, goes to the rear of the front trailer and manually re-connects the carrier to the rear of the front trailer. The operator again returns to the tractor and backs up the front trailer and mobile connector carrier until the connector pin on the front end of the rear trailer seats in the fifth wheel socket of the carrier. All of the vehicles which are elements of the tandem assembly are now connected. The dollies on the rear trailer are elevated and the air and electric lines are connected to render the entire tandem assembly road-ready.

Certain types of laterally shiftable platforms for supporting the wheels of motor vehicles are known, as shown by the following U.S. patents:

| | | |
|---|---|---|
| 2,924,389 | Anderson | Feb. 9, 1960 |
| 3,199,783 | Hurst | Aug. 10, 1965 |
| 3,746,251 | Bernardi, et al | Jul. 17, 1973 |
| 3,786,988 | Thompson | Jan. 22, 1974 |

All of the above patents disclose various types of transversely moveable plates, located beneath a wheel guide, such as a wheel guide used in a car wash apparatus. The purpose of the plates is to move transversely with the front or rear wheels of the moving vehicle, supported on the plate, when the wheels engage the wheel guide off-center. Forward movement of the vehicle causes the wheels and the transverse plate to move to position the wheels in alignment with the wheel guides.

SUMMARY OF THE INVENTION

This invention relates to a method and apparatus for positioning one or more rear trailers behind a tandem assembly, including a tractor, a front trailer and a mobile connector carrier, such as a "JIFFLOX" carrier, to facilitate the connection of the carrier to the adjacent rear trailer.

More specifically, this invention contemplates the pre assembly of the tractor, front trailer and the mobile connector carrier in a tandem assembly, and subsequently shifting a rear trailer from an initial position, laterally offset from the linear axis of the tandem assembly, to a connecting position behind and in line with the tandem assembly. The second trailer should be positioned close enough to the rear end of the front trailer and its connector carrier that only a slight rearward movement of the tandem assembly will automatically couple the connector carrier to the front end of the rear trailer.

In a preferred form of the invention, the rear trailer is positioned upon and supported by a moveable platform member which is powered to shift laterally and reciprocably from an initial position in which the rear trailer is located to the rear of and laterally offset from a linear path of movement of the tandem assembly. After the assembled tractor, front trailer and connector carrier are moved forward along the linear path to a preliminary position in which the connector carrier is located in front of and laterally offset from the platform member, the platform member is actuated to shift laterally to move the rear trailer behind the connector carrier and in line with the tandem assembly for subsequent connector. After the rear trailer is connected to the carrier, the dollies on the rear trailer are elevated and the power and air lines connected, the entire tandem assembly is then road-ready and moved away from the platform member. At this point, the platform member is actuated to return to its initial position. Either manual or automatic switches may be located along the linear path in advance of the platform station, which may be sequentially actuated in order to move the platform member from its initial position to its connecting position, and subsequently to return to its initial position.

BRIEF DESCRIPTION OF THE DRAWING

FIG. 1 is a top plan view of an apparatus made in accordance with this invention, with the pre-assembled tractor, front trailer and connector tandem in its preliminary position and the rear trailer in its connecting position;

FIG. 2 is a fragmentary plan view similar to FIG. 1, illustrating the pre-assembled tandem moving forward in its linear path across the platform station, and disclosing the rear trailer in its initial position; 3 FIG. 3 is an enlarged top plan view of the platform station, made in accordance with this invention;

FIG. 4 is an enlarged fragmentary section, taken along the line 4—4 of FIG. 3; and FIG. 5 is a substantially enlarged, fragmentary plan view of one corner portion of the platform station.

DESCRIPTION OF THE PREFERRED EMBODIMENT

Referring now to the drawings in more detail, FIGS. 1 and 2 disclose schematically a conventional pre-assembled tractor-trailer tandem assembly 10, including a tractor 11, a front trailer 12 and a mobile connector carrier 13, better known in the trucking industry as a "JIFFLOX". The tractor 11 is connected in a conventional manner to the front end of the front trailer 12 by a fifth wheel connector 14 and a cooperating pin connector 15 (FIG. 1). The rear end of the front trailer 12 is coupled to the tongue 16 of the carrier 13 by coupling pin 17 (FIG. 1). The connector carrier 13 is provided with a fifth wheel 18 for connection to a corresponding connector pin 19 beneath the front end portion of a rear trailer 20. The rear trailer 20 is provided with a pair of rear wheels 21 and a pair of conventional dollies or legs 22, adapted to be elevated by a crank, not shown.

As disclosed in FIGS. 1 and 2, the tandem assembly 10 is located longitudinally along a linear path 24, illustrated in dashed lines, so that the longitudinal axis of the tandem assembly 10 is substantially coaxial with the longitudinal axis 25 of the linear path 24.

Disposed transversely of the linear path 24 is a platform station 28. The platform station 28 may be mounted above ground, or may be submerged in the ground 29, as disclosed in FIG. 4. The platform station 28 may include, as disclosed in FIGS. 3–5, a rectangular foundation wall 30 made of concrete, submerged in a corresponding cavity 31 are a plurality of concrete piers 32, upon which are mounted a plurality of parallel I-beams 33. The tops of the I-beams 33 are provided with elongated channels or tracks 34 for rollably carrying the wheels 35 journaled on the legs 36 depending from a moveable platform member 37. The platform member 37 is preferably large enough to at least support the wheels 21 and the dollies 22 of a rear trailer 20 so that the longitudinal axis 38 of the rear trailer 20 is parallel to the longitudinal axis 25 of the linear path 24 (FIG. 2).

In order to shift or move the platform member 37 transversely of the linear path 24, the opposite ends of a sprocket chain 40 are connected to corresponding brackets 41 fixed to the legs 36 of the platform member 37. The chain 40 is trained about the sprockets 42 and 43 at opposite ends of the platform station 28. The sprockets 42 and 43 may be located in the sprocket wells 44 and 45 outside the foundation walls 30, as disclosed in FIGS. 3–5. The sprockets 43 are fixed upon a driven sprocket shaft 46, which in turn is driven through a sprocket-chain transmission 47 from a motor 48, such as the electrical motor disclosed in FIGS. 3 and 4.

As disclosed in FIGS. 3 and 4, the platform member 37 occupies about one-half of the plan area of the foundation wall 30 and normally remains in its initial position, specifically the left-hand position disclosed in FIG. 3, and as disclosed in FIG. 2.

A fixed platform 50 in the form of a solid tread plate, preferably made of steel, is supported by a higher set of concrete piers 51, to occupy the right-hand half of the platform station 28 disclosed in FIGS. 3 and 4. The tread plate 50 is supported upon transverse I-beams 52, and is also provided with parallel transverse slots 53 to form guideways for the transverse reciprocable movement of the platform legs 36 as the platform member 37 traverses the platform station 28.

As disclosed in FIGS. 3 and 4 the top surfaces of the platform member 37 and the tread plate 50 are planar and devoid of any upward projections. The top surface of the platform member 37 is uninterrupted.

In a preferred form of the invention, the electrical motor 48 is energized from an electrical circuitry within a control box 55, which in turn is electrically connected to the first and second switches 56 and 57, located at spaced intervals along the pathway 24, as illustrated in FIG. 1.

In the operation of the invention, the platform member 37 is located in its initial position as disclosed in FIGS. 2, 3 and 4. The tractor 11, or another tractor, is initially backed up to the front end of a rear trailer 20 until its connector pin 19 is seated in the socket of the fifth wheel 14 of the tractor 11, as illustrated in FIG. 2. The tractor 11 then pulls the rear trailer 20 behind the platform station 28 and moves forwardly across the platform member 37, until the rear trailer 20 is in its initial position upon the platform member 37, with its rear wheels 21 and dollies 22 supported fully upon the platform member 37, as illustrated in FIG. 2. The tractor 11 is then disconnected from the rear trailer 20.

The tractor 11 is then backed up to a front trailer 12 until its fifth wheel 14 is connected to the connector pin 15 in a conventional manner. The connector carrier 13, such as a "JIFFLOX" is then coupled by pin 17 to the rear end of the front trailer 12 to form the elongated tandem assembly 10, as disclosed in FIG. 1. The tandem assembly 10 is then driven behind the platform station 28, and while the rear trailer 20 is supported on the platform member 37 in its initial position, the tandem assembly 10 is driven forward across the thick tread plate 50 of the platform station 28 and moved along the pathway 24 longitudinally of the axis 25, as illustrated in FIG. 2, until the tandem assembly 10 is stopped in its preliminary position disclosed in FIG. 1. In this preliminary position, the rear end of the connector carrier 13 is spaced slightly forward of the connecting position of the trailer 20, such as that illustrated in FIG. 1, while the rear trailer 20 is still in its initial position disclosed in FIG. 2.

When the tandem assembly 10 is in its preliminary position disclosed in FIG. 1, the first switch 56 is actuated to energize the circuit in the control box 55 in order to drive the motor 48 in a direction to laterally shift the platform member 37 from its initial position in FIG. 2 (left-hand position in FIG. 3) toward its connecting position in line with the tandem assembly 10, as illustrated in FIG. 1. When the rear trailer 20 has reached its connecting position, the operator in the tractor 11 reverses the direction of the tandem assembly 10 slowly, maintaining the rearward movement of the connector carrier 13 as nearly colinear of the longitudinal axis 25 as possible, until the fifth wheel 18 engages and connects with the connector pin 19. The dollies 22 are then elevated and the air and electrical lines connected between the carrier 13 and the rear trailer 20 to render the entire tandem assembly 10, including the rear trailer 20, road-ready. The tractor 11 is then driven forward to move the rear trailer 20 forwardly of the platform station 28 until the rear trailer 20 has cleared the fixed tread plate 50. At this point, the second switch 57 is actuated to reverse the controls in the box 55, causing the motor 48 to reverse and return the platform member 37 to its initial position disclosed in FIGS. 2, 3 and 4.

The switches 56 and 57 may be manually operated by the driver of the tractor 11. The switches 56 and 57 may also be automatic, in the form of tread switches or photoelectric switches which will be actuated sequentially as the tandem assembly 10 moves first to its preliminary position disclosed in FIG. 1 and subsequently to a forward position away from the platform station 28.

It is also within the scope of this invention to replace the motor 48 and the sprocket-and-chain transmissions 47 and 40 with a fluid-actuated ram or other motive means for moving the platform member 37 reciprocably between its initial position and its connecting position.

The width of the pathway 24 is preferably slightly greater than the width of any of the trailers 12 or 20, or the tractor 11. The platform member 37 is, of course, spaced laterally from the pathway 24 to permit free passage of the tandem assembly 10 forward across the platform station 28 when the trailing or second trailer 20 is in its initial position, as disclosed in FIG. 2.

As previously mentioned, the platform station 28 may also be mounted above the ground 29 with ramps for approaching and leaving the platform station 28, if desired.

It is also within the scope of this invention to connect a third rear trailer to the rear end of the second rear trailer 20 by supporting the third trailer upon the platform member 37 in a position disclosed in FIG. 2 and mounting a connector carrier 13 to the rear end of the rear trailer 20 after the tandem assembly 10 has been fully assembled. The two-trailer tandem assembly is then moved forward across the tread plate 50 until the second carrier is located in the position occupied by the first carrier 13 in FIG. 1 and the platform member 37 shifted laterally to locate the third trailer behind the second carrier. Otherwise, the steps of connecting a third trailer are essentially the same as those for connecting a second trailer to the tandem assembly.

What is claimed is:

1. A method of positioning a rear trailer for connection to a front trailer in a tandem tractor-trailer assembly, comprising the steps of:

(a) moving a rear trailer having a front end, a rear end, and a longitudinal axis longitudinally forward across a platform station until said rear trailer is fully supported upon a platform member in said platform station in an initial rear trailer position,
    (b) pre-assembling a tandem assembly, including the coupling of the front end portion of a front trailer having a longitudinal axis to a tractor and the coupling of a connector member to the rear end portion of the front trailer, said connector member being adapted to automatically connect to the front end of said rear trailer when engaged,
    (c) moving said tandem assembly forward in a longitudinal path parallel to said rear trailer in said initial position, and across a solid tread member in said platform station until said tandem assembly has cleared said platform station and is located in a preliminary position in which said connector is spaced in front of said platform station, laterally offset from and in front of said rear trailer in said initial position,
    (d) laterally shifting said platform member supporting said rear trailer in said initial position transversely of said longitudinal path and along said platform station to a connecting position in alingment with said longitudinal path and behind said connector member in said preliminary position,
    (e) moving said tandem assembly rearward until said connector member engages and connects to the front end of said rear trailer in said connecting position, and
    (f) moving said tandem assembly connected to said rear trailer forward until said rear trailer has cleared said platform member.

2. The invention according to claim 1 in which said tread member is fixed in said platform station and said step of laterally shifting said platform member comprises laterally shifting said platform member over said tread member.

3. The invention according to claim 1 further comprising the step of moving said platform member from said connecting position to said initial position after said rear trailer has cleared said platform station.

4. The invention according to claim 1 in which said connector member is a mobile connector carrier supporting a connector adapted to engage and be connected to a cooperating connector on the front end of said rear trailer.

5. The invention according to claim 4 in which said connector is a fifth wheel connector.

6. The invention according to claim 1 in which said platform member comprises an uninterrupted planar top surface.

7. The invention according to claim 1 in which said platform member and said tread member have top surfaces devoid of any upward projections.

* * * * *